(12) United States Patent
Shima

(10) Patent No.: US 6,876,464 B1
(45) Date of Patent: Apr. 5, 2005

(54) PRINTER, RECORDING MEDIUM AND PRINTER MEMORY MANAGEMENT METHOD

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/558,186

(22) Filed: Apr. 26, 2000

(30) Foreign Application Priority Data

Apr. 30, 1999 (JP) .......................................... 11-123912

(51) Int. Cl.$^7$ .............................................. G06F 15/00
(52) U.S. Cl. .................... 358/1.16; 358/1.15; 358/1.14; 358/1.17
(58) Field of Search ............................. 358/1.15, 1.13, 358/1.14, 1.16, 1.17, 296

(56) References Cited

U.S. PATENT DOCUMENTS 6,397,265 B1 * 5/2002 Iwamoto ........................ 710/1
6,421,135 B1 * 7/2002 Fresk et al. ................. 358/1.15
6,603,565 B1 * 8/2003 Scheidig et al. ........... 358/1.13

* cited by examiner

Primary Examiner—Twyler Lamb
(74) Attorney, Agent, or Firm—Osha & May L.L.P.

(57) ABSTRACT

Provided is a printer which accelerates the printing speed of a printer without having to make the processing wait even when a printer corresponding to various types of printer language receives print job data in a printer language other than the same currently under processing. The present invention is a printer which prints by loading into a memory an Interpreter Program corresponding to a printer language, generating image data from the print job data and loading such image data into the memory pursuant to the execution of the interpreter program, and supplying this to the print engine. When job data in a language different from the one currently under processing is received, a new interpreter program is loaded into the memory before the image data currently under processing is completely supplied.

12 Claims, 4 Drawing Sheets

PRINTER, RECORDING MEDIUM AND PRINTER MEMORY MANAGEMENT METHOD

BACKGROUND OF THE INVENTION

1. Field of the Invention

The present invention generally relates to printer technology. The present invention particularly relates to a printer which prints by loading an interpreter program corresponding to the printer language of the received printer job data, generating image data from the print job data pursuant to the execution of the interpreter program and supplying the generated image data to a print engine.

2. Description of the Related Art

A typical printer receives print job data through printer drivers executed on host computers, generates image data by interpreting the print job data, and thereby prints on print recording media. Generally, a printer receives prints job data in various types of printer languages. Consequently, a printer stores in a ROM printer language interpreter programs (hereinafter referred to as "Interpreter Program") corresponding to each printer language, and, after loading into a RAM a specific Interpreter Program corresponding to the print job data received, interprets the job data and generates image data pursuant to the execution of the Program thereof.

As described above, a printer loads an Interpreter Program stored in the ROM of low access speed into the RAM of high access speed and thereafter executes the Interpreter Program thereof. Meanwhile, as there is a constant demand for accelerating the printing speed of a printer and lowering the cost of the product, a RAM loaded into a printer also has a set memory size to the extent of not interfering with the print processing. Therefore, when a conventional printer receives print job data in a certain printer language and thereafter receives print job data in another printer language, it could not process the data in the latter language until the processing of the data in the former printer language is completed. That is, a printer loaded into a RAM an Interpreter Program corresponding to the latter printer language after completing the processing of print job data in the former language and releasing the memory. Accordingly, in printers which accept various types of print job data from a plurality of users or application programs, there is a problem in that the latter processing had to wait until the former processing is completed and the memory is released in such cases where the printer language is switched.

SUMMARY OF THE INVENTION

Thus, an object of the present invention is to accelerate the printing speed of a printer without having to make the processing wait unnecessarily, even when a printer corresponding to various types of printer languages receives print job data in a language other than the one currently under processing.

The present invention is a printer which prints by loading into a memory an Interpreter Program corresponding to the printer language of the print job data received, generating image data (including intermediate codes) from the print job data and writing such image data into the memory pursuant to the execution of the Interpreter Program, and supplying to the print engine the image data loaded into the memory. When print job data in the second language is received before the first language is completely processed, an Interpreter Program corresponding to the second language is loaded into the memory before image data based on the print job data in the first language is completely supplied to the print engine.

Here, it is preferable that the printer, while supplying to the print engine image data based on the print job data in the first printer language, generates image data pursuant to the execution of the Interpreter Program corresponding to the second printer language.

Further, it is preferable the printer judges whether the usable area in the memory is larger than the area required by the Interpreter Program upon loading into the memory the Interpreter Program corresponding to the second printer language, and loads the Interpreter Program into the memory when the usable area is judged to be larger. It is preferable that the usable area is at least equivalent to the area of the Interpreter Program corresponding to the first language and the area of the image data supplied to the print engine.

Furthermore, it is preferable that the printer loads the Interpreter Program into the memory after generating all image data based on print job data pursuant to the execution of the Interpreter Program corresponding to the first printer data.

Moreover, it is preferable that the printer stores the Interpreter Program in a compressed state, and loads the Interpreter Program into the memory while decompressing such compressed Interpreter Program.

In addition, the present invention is a printer comprising a first storage means for storing print job data received from a host computer, a second storage means for storing Interpreter Programs for interpretation of the job print data, a third storage means for storing the Interpreter Program for the execution of the Interpreter Program as well as storing image data generated based on the print job data, a loading means for reading from the second storage means the Interpreter Program corresponding to the print job data and loading such Interpreter Program into the third storage means, a generation means for generating image data pursuant to the execution of the Interpreter Program loaded by the loading means and writing the generated image data in the third storage means, and a controlling means for reading image data generated by the generation means and stored in the third storing means and supplying such image data to a print engine so as to print on a print recording medium. While reading the first image data generated pursuant to the execution of the first Interpreter Program for interpreting print job data in the first printer language, the loading means loads the second Interpreter Program for interpreting the print job data in the second printer language into the third storage means.

In addition, the present invention provides a recording medium having recorded thereon a program to realize specific functions in a controller of a printer.

Further, a recording medium includes memories such as a RAM or ROM, as well as, for example, a hard disk (HD), DVD-RAM, flexible disk (FD), CD-ROM, etc. Furthermore, the controller of the printer includes those constituted by so-called microcomputers, etc. for performing prescribed processing pursuant to the interpretation of a program by a so-called central processing unit, for example, CPU or MPU.

DESCRIPTION OF THE PREFERRED EMBODIMENT

An embodiment of the present invention is now described with reference to the drawings.

Figure 1:
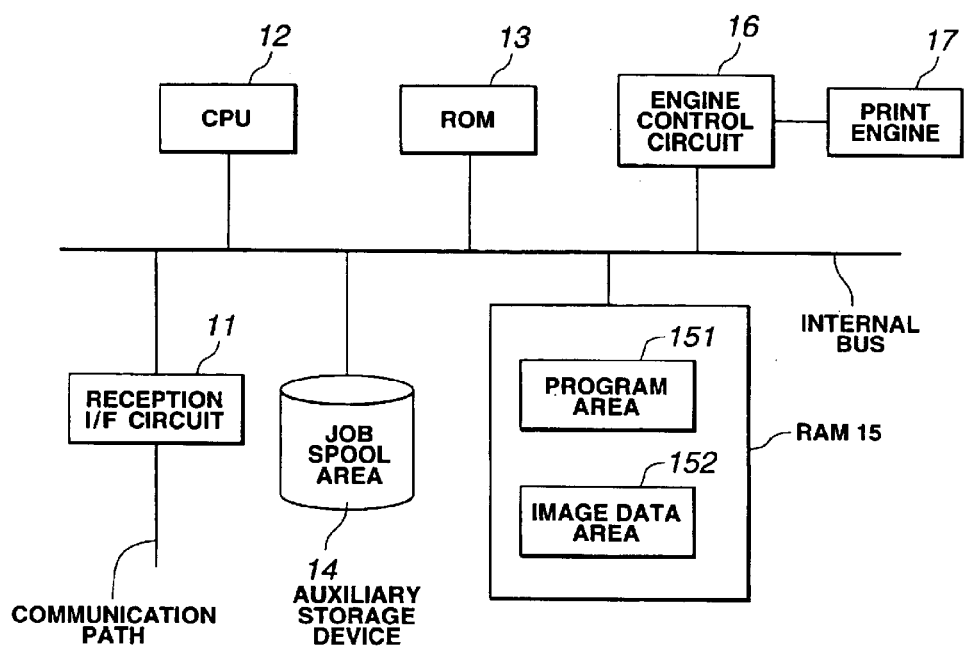
FIG. 1 is a block diagram illustrating the simplified hardware structure of a printer according to this embodiment.

FIG. 1 illustrates the simplified hardware structure of a printer of this embodiment. As shown in FIG. 1, a printer of this embodiment comprises a communication interface circuit (hereinafter referred to as "communication I/F circuit") 11 for communicating with a host computer, CPU 12 for controlling the overall operation of the printer, ROM 13 for storing various programs and printer fonts, auxiliary storage device 14 for storing print job data, RAM 15 for temporarily storing programs to be executed and image data, engine control circuit 16 for controlling the operation of print engine 17, and the print engine 17 for printing on a print recording medium (i.e. print paper).

When printing is executed, the host computer delivers to a printer driver documents in an application program of a word processor or the like, converts such documents into print job data, and thereafter sends this to the printer through a communication path. The printer receives such print job data from the communication I/F circuit 11 connected to the communication path, and prints upon prescribed processing. Further, the communication path is realized with networks such as a LAN, parallel lines, serial lines, or the like.

When the communication I/F circuit 11 receives print job data from the host computer, it notifies the CPU 12 thereof and sends such print job data to the auxiliary storage device 14 through an internal bus while accumulating such print job data in a receiving buffer (not shown). For the transfer of the print job data from the communication I/F circuit 11 to the auxiliary storage device 14, the DMA device can be used. The communication I/F circuit 11, for example, in the case of being connected to a LAN, is composed of drivers and the like corresponding to various hardware and various protocols such as TCP/IP.

The CPU 12 controls the overall processing operation of a printer in accordance with a control program stored in the ROM 13. For example, the CPU 12 loads an Interpreter Program stored in the ROM 13 into a program area of the RAM 15 and, by executing this Interpreter Program, generates image data from print job data stored in the auxiliary storage 14 and writes this to an image data area of the RAM 15.

The ROM 13, as mentioned above, stores various programs, printer fonts and other data. In this embodiment, the ROM 13 stores a plurality of Interpreter Programs corresponding to printer languages. Further, it is preferable that these Interpreter Programs are respectively stored upon being compressed, and decompressed in the phase of being loaded into the RAM 15.

The auxiliary storage device 14 stores print job data in a prescribed spool area. It is preferable that the auxiliary storage device 14 is capable of spooling a plurality of print job data. The auxiliary storage device 14 is composed of, for example, hard disk devices and the like. The print job data spooled by the auxiliary storage device 14 is read in the spooled order.

The RAM 15 works as a main storage of the CPU 12, and stores programs and image data in their respective areas. A program area stores Interpreter Programs decompressed and loaded from the ROM 13 and includes the work area of the Interpreter Programs. In this embodiment, the size of the program area shall differ depending on the Interpreter Program to be loaded, and accordingly, the size of the image data shall also differ. Further, a DRAM or SRAM is typically adopted as the RAM 15.

The engine control circuit 16, while controlling the print engine 17, reads image data loaded into an image data area of the RAM 15 and supplies this to the print engine 17. The print engine 17 performs printing on print recording media such as paper. The print engine 17, in the case of a laser printer, for example, is composed of a laser irradiation mechanism, an optical sensitive drum and a paper feed mechanism. Suitably selected as the print engine 17 may be those of monochrome or color, or those having high speed or low speed.

A printer of this embodiment prints by loading into a memory an Interpreter Program corresponding to the printer language received, generating image data based on the print job data received pursuant to the execution of this program and supplying such image data to a print engine. Thus, when job data in the latter language is received before the former print job data is completely processed, a specific Interpreter Program corresponding to the printer language of the latter printer job data is loaded into the memory before the former print job data is completely processed, and image data based on the latter job data is generated. More preferably, in the phase of completing the generation of all image data based on the current job data and supplying this to a print engine, whether an area of the Interpreter Program corresponding to the printer language of the latter job data can be secured on the memory is judged, and if judged to be securable, the latter Interpreter Program is loaded and image data is generated without waiting for the completion of processing of the former print job data. Further, image data may be the so-called dot image data or data in the form of so-called intermediate codes. The printer of this embodiment is now explained with reference to the functional block diagram representing the printer functionally.

Figure 2:
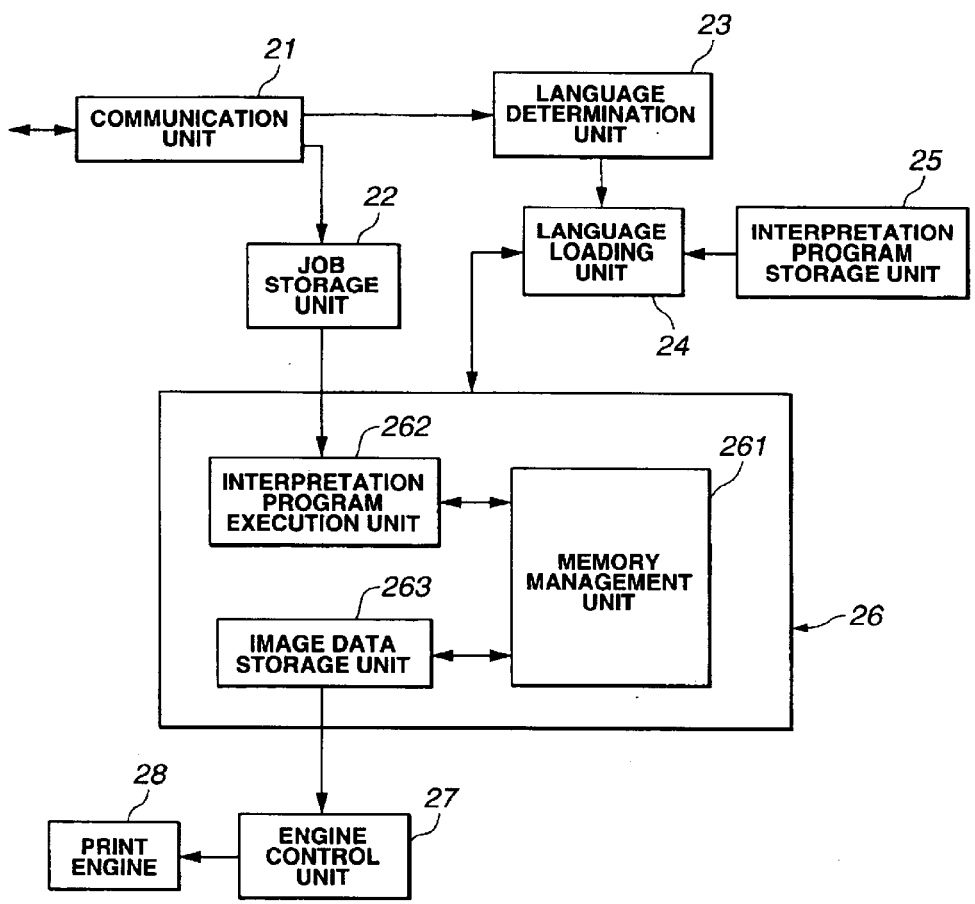
FIG. 2 is a flow chart illustrating the functional structure of a printer according to this embodiment.

FIG. 2 illustrates the functional structure of a printer of this embodiment. In this figure, the communication unit 21 communicates with a host computer through a network and receives print job data from a host computer. The communication unit 21 sends to the job storage unit 22 the print job data received. Further, if the communication unit 21 receives new print job data, in other words, receives the head data of the print job data, it notifies this to the language determination unit 23. The job storage unit 22 stores print job data sent from the host computer respectively. The print job data stored in the job storage unit 22 is read and processed for printing typically in the order of receipt. When the language determination unit 23 receives the notification of having received print job data from the communication unit 21, it determines the printer language for the print job data. The printer language is determined, for example, by referring to the attribute information described in the header part of print job data or extracting the characteristic portions existent in each printer language. Among printer languages, Post Script language and ESC/Page language are known. The language determination unit 23 sends the determination result to the language loading unit 24. The language loading unit 24 reads the Interpreter Program stored in the Interpreter Program storage unit 25 and sends this to the image data generation unit 26. In the Interpreter Program storage unit 25, Interpreter Programs corresponding to each printer language are respectively stored. Further, it is preferable that the Interpreter Program unit 25 stores Interpreter Programs in a compressed form. In such case, the language loading unit 24, while decompressing a compressed Interpreter Program, sends this to the image data generation unit 26. Moreover, it is preferable that the language loading unit 24 stores the name of the last Interpreter Program (i.e. printer language) read from the Interpreter Program storage unit 25. Consequently, the language loading unit 26 does not need to re-load an Interpreter Program if the type of printer language notified from the language determination unit 23 is the same as that loaded the last time. It is also preferable that the language loading unit 24 respectively stores the decompressed size of the compressed Interpreter Programs.

The image data generation unit 26 comprises a memory management unit 261, Interpreter Program execution unit 262 and image data storage unit 263. This image data generation unit 26 is realized by CPU 12 and RAM 15 and various programs (control program and/or interpreter program) executed by CPU 12 as represented in FIG. 1. The memory management unit 261 manages the program area (including the program work area) formed on the RAM 15 and the access processing to an image data storage area, as well as the status of the space area on the RAM 15. The Interpreter Program execution unit 262 reads the print job data stored in the job storage unit 22, generates image data, and writes this in the image data storage unit 263 through the memory management unit 261. If print job data to be processed includes a plurality of pages, the Interpreter Program execution unit 262 generates image data corresponding to each page in turn within the range of the image data storage area.

The engine control unit 27 controls the operation of the print engine unit 28, and supplies to this print engine 28 the image data stored in the image data storage unit 263. Concretely, the engine control unit 27 sends a print-preparation request to the print engine unit 28 upon at least one page worth or one band width of image data being written in the image data storage part 263. Upon receiving the print-preparation request, the print engine 28 sets paper and responds to the engine control unit 27 that preparation for printing is complete. Thus, the engine control unit 27 supplies image data to the print engine 28 according to the operation status, and printing is executed by the print engine 28. Further, the area used by the image data read by the engine management unit 27 and which became unnecessary will be released by the memory management unit 261 as a usable memory area.

Figure 3:
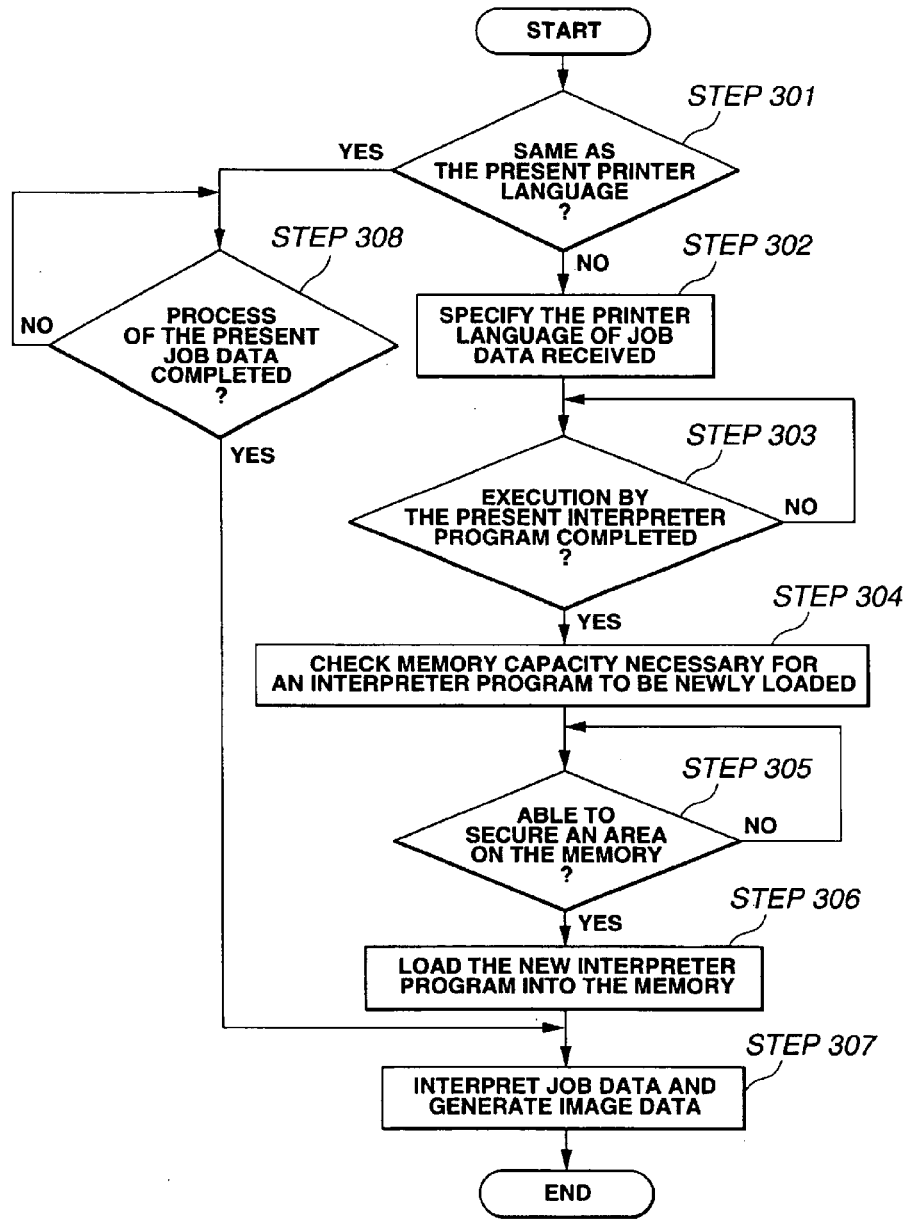
FIG. 3 is a flow chart illustrating the operation of a printer according to this embodiment.

FIG. 3 illustrates the operation of a printer of this embodiment. First, when the communication unit 21 receives print job data from a host computer, the language determination unit 23 determines whether or not the printer language of this print job data is the same as that of the Interpreter program previously loaded (STEP 301). If the language is determined not to be the same as the current one, the language determination unit 23 specifies a printer language of the print job data received and notifies this to the language loading unit 24 (STEP 302). The language loading unit 24 inquires to the image data generation unit 26 whether or not the processing by the Interpreter Program previously loaded is completed (STEP 303). As a result of this inquiry, if the language loading unit 24 receives a response of the processing being incomplete, it waits until it receives a response of the processing being completed. Completion or incompletion of the processing by the Interpreter Program is judged according to whether or not all image data has been processed based on the job data stored in the job data storage unit 22. The language loading unit 24 confirms the size of the area necessary for an Interpreter Program to be newly loaded (STEP 304), and judges whether or not it is possible to secure this Interpreter Program on the memory (STEP 305). In such case, if the language loading unit 24 judges that it is not possible to secure such size of area on the memory, image data is read by the engine control unit 27, and the language loading unit 24 waits until it is able to secure the necessary space. Here, it is preferable to check whether or not necessary space was securable each time image data is read in page units. If the language loading unit 24 judges that it is possible to secure the space in the memory, it loads a new Interpreter Program into the memory through the memory management unit 261 (STEP 306). Then, the Interpreter Program execution unit 262, which is an execution element of a loaded Interpreter Program, reads the job data stored in the job storage part 22 and generates image data (STEP 307). On the other hand, if the language determination unit 23 judges in STEP 301 that the printer language to be loaded is the same as the current printer language, the Interpreter Program execution unit 262 waits until the Interpreter Program previously loaded completes processing the current print job data (STEP 308). Then, in the phase that the Interpreter Program previously loaded completes processing the current print job data, the Interpreter Program execution unit 262 reads new print job data and generates image data (STEP 307).

Figure 4:
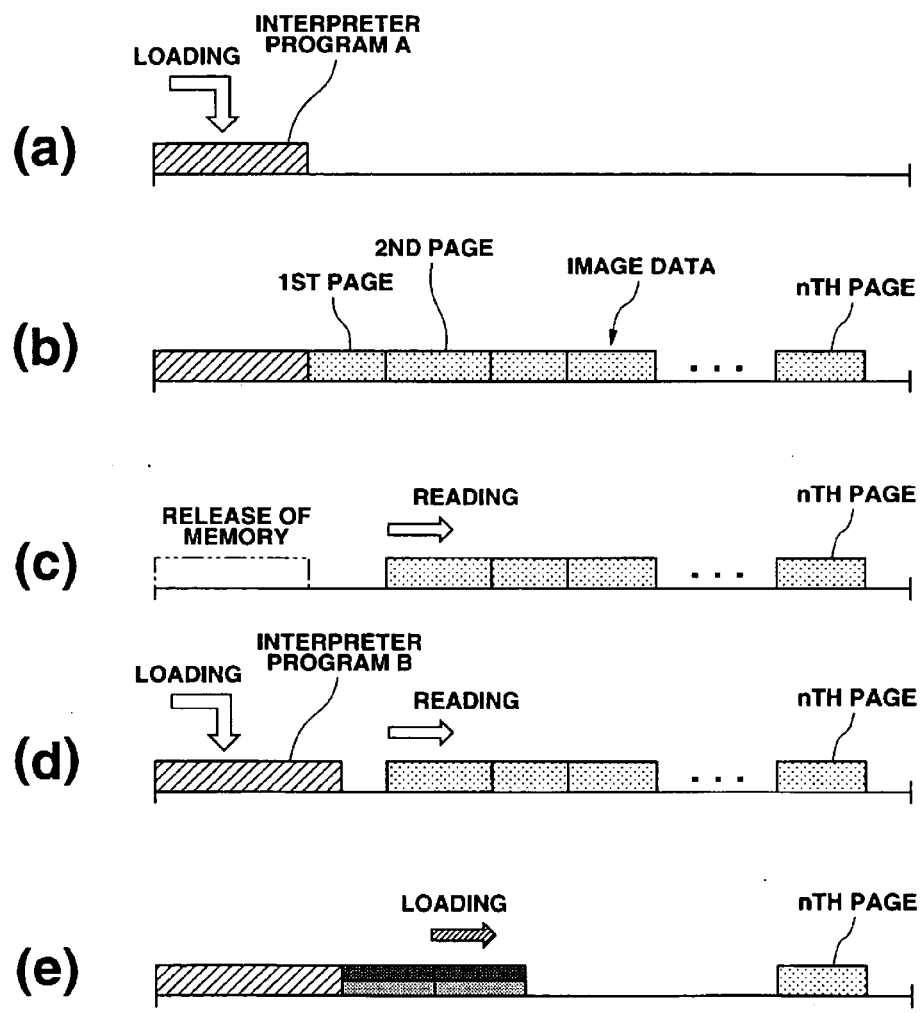
FIG. 4 is a timing chart illustrating an example of using a memory of a printer according to this embodiment.

FIG. 4 illustrates an example of using a memory in a printer of this embodiment. This figure one-dimensionally represents an address space in the RAM 15 and shows the status of Interpreter Programs and image data using the space on the RAM 15. First, FIG. 4(*a*) represents the status where Interpreter Program A corresponding to a printer language of the first print job data is loaded into the RAM 15. The printer executes this Interpreter Program A, and as represented in FIG. 4(*b*), generates image data consisting of n pages based on the first print job data. At this time, the second print job data in a printer language different from that of the first printer language is received. In the phase of finishing the generation of all image data based on the first print job data, the printer releases the area used by Interpreter Program A and checks whether or not Interpreter Program B corresponding to the second print job data can be loaded into such area on the RAM 15. In this example, as the size of Interpreter program B to be loaded is larger than that of Interpreter Program A previously loaded, it is judged that the area necessary for loading Interpreter Program B into the RAM 15 can not be secured immediately after finishing the generation of image data. Accordingly, Interpreter Program B waits to be loaded. The printer, as represented in FIG. 4(*c*), supplies image data to the print engine 17 in order from the first page of the image data, and checks the size of the space area each time one page worth of image data is completely supplied. Further, checking is conducted in page units because re-supplying image data for the same page is necessary pursuant to the errors occurring in the print engine 17 and so on. In the phase that the image data of the first page is supplied, a printer judges that Interpreter Program B can be loaded as the size of the area used by Interpreter Program A plus the area used by the image data of the first page is larger than the size of Interpreter Program B, and loads Interpreter Program B as represented in FIG. 4(*d*). Then the printer executes Interpreter Program B and likewise generates image data based on the second print job data.

Further, if a printer judges that the size of the area used by an Interpreter Program already loaded is larger than that of an Interpreter Program to be loaded thereafter, it will be able to load the Interpreter Program to be loaded in such phase.

As described above, a printer according to the present embodiment prints by loading into a memory an Interpreter Program corresponding to a printer language of the print job data received, generating image data thereby, and supplying such image data to a print engine. Thus, even when a printer language different from the language currently under processing is received, the latter Interpreter Program is loaded before processing of the former print job data is complete as the necessary area becomes securable. Therefore, avoided is the situation of having to make the processing unnecessarily wait.

According to the present invention, a printer corresponding to various kinds of printer languages will not unnecessarily wait for processing even if it receives print job data in a language different from the print job data currently under processing. Thus, accelerating the printing speed of a printer is realized even upon randomly receiving print job data in different languages.

What is claimed is:

1. A printer with a print engine for executing printing on a print recording medium, comprising:
   a first memory for storing a first interpreter program corresponding to a first printer language and a second interpreter program corresponding to a second printer language;
   a second memory into which at least one of said first interpreter program and said second interpreter program stored in said first memory is loaded;
   loading means for reading from said first memory said first interpreter program corresponding to a printer language of received first print job data and loading said first interpreter program into said second memory;
   generation means for generating image data based on said first print job data by executing said loaded first interpreter program; and
   an engine controller for supplying said generated image data to said print engine;
   wherein said loading means loads into said second memory said second interpreter program before said engine controller completely supplies to said print engine said generated image data based on the first print job data.

2. The printer according to claim 1, wherein said second memory stores image data generated by said generation means.

3. The printer according to claim 2, wherein said generation means, while said engine controller supplies said image data to said print engine, generates image data based on a second print job data in a second printer language by executing said second interpreter program.

4. The printer according to claim 3, wherein said loading means judges whether a usable area in said second memory is larger than the area required for said second interpreter program to be loaded, and loads said second interpreter program into said second memory when said usable area is judged to be larger.

5. The printer according to claim 4, wherein said loading means judges as said usable area the area of the first interpreter program corresponding to said first printer language as well as the area equivalent to the area of said image data supplied to said print engine.

6. The printer according to claim 2, wherein said generation means generates image data by interpreting said first print job data in said first printer language to the final data and thereafter loads said second interpreter program into said second memory.

7. The printer according to claim 1, wherein said first memory stores said first interpreter program and said second interpreter program in a compressed state, and said loading means loads said first interpreter program and said second interpreter program into said second memory while decompressing the same.

8. The printer according to claim 2, wherein said loading means stores the last printer language name of the interpreter program read from said first memory, and loads one of said first interpreter program and said second interpreter program into said second memory when said stored printer language name is different from the printer language name to be loaded into said second memory.

9. A recording medium having recorded thereon a program to be executed by a processor provided in a controller of a printer, wherein said program comprises:
   means for reading from the first memory an interpreter program for generating image data based on print job data received from a host computer and loading this into the second memory; and
   means for generating image data based on said print job data by executing the interpreter program loaded into said second memory, and writing said generated image data in said second memory;
   wherein said loading means loads an interpreter program corresponding to the second printer language into said second memory before image data based on the print job data in the first printer language is completely supplied to a print engine.

10. A memory management method in a controller of a printer, comprising:
    loading from a first memory to a second memory an first interpreter program corresponding to a first printer language of received first print job data;
    generating image data based on said first print job data by executing said first interpreter program, and writing said generated image data into said second memory; and
    executing printing on a print recording medium by supplying to a print engine said image data written in said second memory;
    wherein, upon loading said interpreter program into said second memory, a second interpreter program corresponding to a second printer language is loaded into said second memory before said image data based on said first print job data is completely supplied to said print engine.

11. A controller of a printer, comprising:
    a first memory for storing a first interpreter program corresponding to a first printer language and a second interpreter program corresponding to a second printer language;
    a second memory for storing at least one of said first interpreter program and said second interpreter program read from said first memory and storing image data generated by at least one of a stored first interpreter program and a stored second interpreter program based on a first print job data;
    loading means for reading from said first memory said first interpreter program corresponding to a printer language of received said first print job data and loading this into said second memory;
    generation means for generating image data based on said print job data by executing a loaded first interpreter program; and wherein said loading means loads into said second memory said second interpreter program while image data based on the first print job data is supplied to a print engine.

12. A printer for printing on a print recording medium with a print engine based on print job data sent from a host computer, comprising:

an internal bus;

a program storage unit operatively connecting to said internal bus, wherein said program storage unit stores a plurality of interpreter programs each corresponding to a plurality of print languages;

a memory, operatively connecting to said internal bus, into which one of said plurality of interpreter programs stored in said program storage unit is loaded;

an interface circuit operatively connecting said internal bus, configured to communicate with said host computer in order to receive said print job data;

a processor operatively connecting to said internal bus, wherein said processor generates image data based on said print job data by execution of said loaded one of said plurality of interpreter programs, and writes said image data into said memory; and an engine controller operatively connecting to said internal bus, configured to supply said image data written in said memory to said print engine, wherein, when said interface circuit receives a second print job data during supplying a first image data generated by execution of a first interpreter program corresponding to a first print language of a first print job data, said processor executes operations for:

specifying a print language of said second print job data received from host computer; and loading a second interpreter program corresponding to said specified print language into said memory before said engine controller finishes supplying said first image data.

* * * * *